Oct. 15, 1935.   H. ESSER   2,017,397

METHOD AND APPARATUS FOR WELDING TUBES

Filed Jan. 13, 1933

H. Esser
INVENTOR

By Marks & Clerk
Attys.

Patented Oct. 15, 1935

2,017,397

UNITED STATES PATENT OFFICE 2,017,397

METHOD AND APPARATUS FOR WELDING TUBES

Heinrich Esser, Hilden, Germany

Application January 13, 1933, Serial No. 651,610
In Germany May 23, 1932

7 Claims. (Cl. 205—9)

It is already known in the butt welding of tubes on the drawing bench to raise the temperature at the welding point of the tube as it becomes closed in the drawing funnel and at the same time to blow away the slag by supplying air. For this purpose a special blow head has hitherto been arranged rigidly in front of the drawing funnel by means of which compressed air is blown against the edges to be welded over a great length by means of a number of transverse slots so that a large part of the compressed air passes the strip uniformly and easily gets into the furnace and unfavourably affects the furnace temperature. Such blowing devices require much compressed air and have a comparatively small efficiency.

Arrangements are also known in which the air is blown directly on to the welding place in the drawing funnel through small tubes. Since the introduction of the strip into the drawing funnel is effected without guides, the position of the welding place on the circumference of the tube which is formed varies since the strip runs in obliquely. As a result, it often happens that not the edges to be welded but some other points of the tube are heated by the air supply. Moreover, these arrangements cause obstructions in inserting the drawing funnel.

All these disadvantages are avoided if, according to the invention, the air current is supplied in a direction opposite to the drawing direction, for example, through the tube which is formed or through the drawing funnel to the welding place, the air current preferably being distributed over the whole circumference of the tube. The result is thus obtained that the air current reaches with certainty the points which, in order to obtain satisfactory welding of the edges of the strip, have to be additionally heated and kept free from slag. In addition, further devices which make it more difficult to mount and dismantle the funnel are avoided. Finally, by the new method of supplying air the air consumption of the welding is substantially diminished and by automatically regulating the air supply, as is also provided by the invention, can be still further reduced.

In the accompanying drawing a constructional example of a device for carrying out the new method is illustrated diagrammatically.

Figure 4:
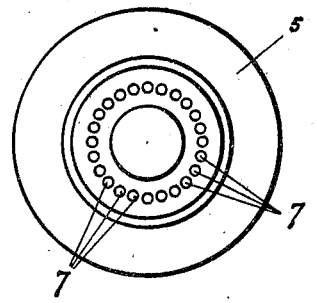

Fig. 4 a plan of the sealing surface of the drawing funnel, and

Figure 5:
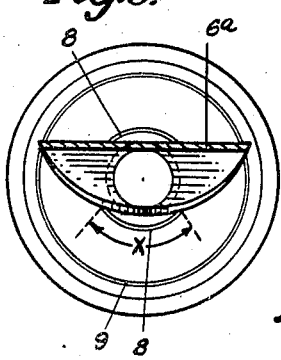

Fig. 5 shows the drawing funnel with the tube in front elevation.

Figure 1:
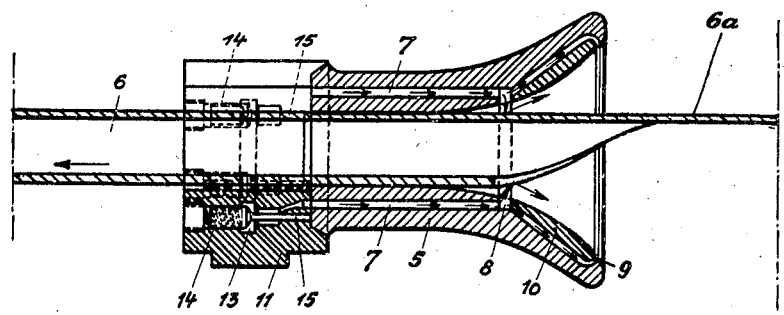
Figs. 1 and 2 show axial sections in the operating position and in the raised position respectively.

5 is the drawing funnel for shaping and closing the tube 6 from a sheet metal strip 6a (Fig. 1). The air current for additionally heating the sheet metal strip before the welding place is according to the invention opposed to the drawing direction, and is supplied either through the tube 6, which is being formed, or through channels 7 in the drawing funnel which are preferably distributed uniformly in a large number around the funnel opening (Fig. 4) and run in the direction of the axis of the funnel. The channels 7 lead to one or more annular channels 8, 9 open on the inside in the head of the drawing funnel 15 which are formed by a concentrically inserted nozzle-like ring 10. The air which is supplied is under comparatively high pressure so that when leaving the passage 8 it cannot flow in any direction. The pressure causes the air jet to leave the passage at such a speed that it strikes obliquely against the tube edges which are to be welded and is deflected through the same angle by the surfaces of the tube or the edges, and flows on in this new direction, that is opposite to the direction of drawing. A flow of the air in the other direction is therefore excluded also because the drawing funnel opening between the tube and the wall of the funnel is closed on the side where the tube leaves the funnel by the metal strip while being bent into tubular shape. The annular passage 8 is thereby also covered over the greater part of its periphery so that only a part of the air passes through the exposed part $x$ (Fig. 5) directly in front of the welded place and impinging upon the welding edges with great velocity in an oblique direction and has to flow opposite to the drawing direction. The remaining air flows through the exposed part of the passage to the rear side of the tube or through the annular passage 9 also in a direction opposite to the drawing direction, although here the direction of flow of the air is not important for the welding process. The essential for obtaining the desired action is that the air current should be blown on to the welding edges in a direction opposite to the drawing direction immediately in front of the welding places so that the suction effect produced by the blank in drawing is removed and also the formation of slag at the welding place is prevented and therefore a satisfactory welding seam is obtained, whereas if there were a distance between the point at which the air is blown on to the tube and the welding place there would be an oxidization and forming of slag at the edges of the strip up to the moment of welding.

Figure 2:
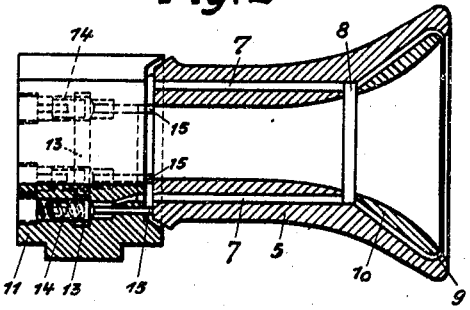
Figure 3:
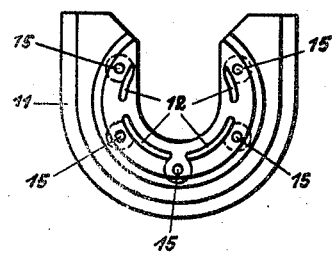
Fig. 3 is a plan of the sealing surface of the abutment.

As the example illustrated shows, the air supply to the channels of the drawing funnel is preferably effected through the abutment 11 which at the end turned towards the drawing funnel is provided with slots 12 (Fig. 3) through which the air passes from an annular space 13 in the abutment into the channel 7 of the funnel. The air supplied is then automatically controlled by the drawing funnel. For this purpose, valves 14 are arranged on the channels in the abutment branching off from the annular space 13 to the slots 12, the cones of which are held in the closed position by spring action or the like and are provided with control members 15 projecting beyond the sealing surface. When the drawing funnel impinges upon the abutment in the drawing process the control members are pressed back so that the valve cones are moved from their seatings and compressed air is allowed access to the drawing funnel (Fig. 1). As soon as the pressure of the drawing funnel ceases at the end of the drawing process the valves, which are acted on by springs or the like, close automatically (Fig. 2) so that the supply of air to the drawing funnel is interrupted until the next drawing operation starts and the funnel is again pressed firmly on to the abutment.

The invention is of course not limited to the constructional example illustrated. Thus, for example, the supply of air to the funnel can be effected from another point instead of through the abutment and the arrangement and number of the air supply channels in the funnel can be different from those illustrated. The principal feature of the invention is that the air current must be supplied to the welding place in a direction opposite to the drawing direction and for this purpose the tube which is being formed or the drawing funnel is preferably used.

What I claim is:

1. A method of welding tubes in which air is supplied for heating the tube and for removing slag from the welding place, characterized by the feature that immediately before the welding place the air flows in a direction opposite to the drawing direction.

2. An apparatus for welding tubes having a drawing funnel and channels therein for supplying air immediately before the welding place in a direction opposite to the drawing direction.

3. An apparatus for welding tubes having a drawing funnel, a plurality of air supply channels in the drawing funnel running in the direction of the axis of the funnel and a plurality of annular channels open on the inside in the head of the drawing funnel, to which the air supply channels lead and through which the air passes out in the direction of the blank.

4. An apparatus for welding tubes having a drawing funnel and channels therein for supplying air immediately before the welding place in a direction opposite to the drawing direction, and a member against which the drawing funnel abuts, and through which air is supplied to the drawing funnel.

5. An apparatus for welding tubes having a drawing funnel, channels therein for supplying air immediately before the welding place in a direction opposite to the drawing direction, a member against which the drawing funnel abuts and through which air is supplied to the drawing funnel and means for controlling the supply of air actuated by the drawing funnel.

6. An apparatus for welding tubes having a drawing funnel and channels therein for supplying air immediately before the welding place in a direction opposite to the drawing direction, and a member against which the drawing funnel abuts, and through which air is supplied to the drawing funnel, and control valves in this member adapted to be opened by the pressure of the drawing funnel against the member in the drawing process and spring means for closing the valves when the pressure ceases.

7. An apparatus for welding tubes having a drawing funnel, a plurality of air supply channels in the drawing funnel running in the direction of the axis of the funnel, and a nozzle-like ring placed concentrically within the drawing funnel at its wider end so as to form a plurality of annular channels, to which air supply channels lead and through which the air passes out towards the blank.

HEINRICH ESSER.